United States Patent Office 3,578,570
Patented May 11, 1971

3,578,570
ALUMINUM CAPACITOR FOIL
Gerald Harvey Kissin, Spokane, Wash., assignor to Kaiser Aluminum & Chemical Corporation, Oakland, Calif.
No Drawing. Filed Sept. 25, 1967, Ser. No. 670,402
Int. Cl. C23b 3/00
U.S. Cl. 204—33                                        2 Claims

ABSTRACT OF THE DISCLOSURE

A capacitor foil alloy and a method for making capacitor foil by constituting an aluminum alloy of high purity aluminum containing from 0.02 to 0.1% magnesium, and less than 0.002% sodium, preferably preheating the alloy to a temperature above 950° F., rolling to a foil, electrolytically etching the foil and anodizing the etched foil.

DESCRIPTION OF THE INVENTION

This invention relates to a method for producing capacitor foil, to the resultant foil, and to an alloy suitable for such foil.

Capacitors are frequently made of aluminum foil having on its surface an insulating coating. The insulating coating may be an anodized oxide layer or a varnish or other dielectric material. The capacitance of such a capacitor is increased by increasing the surface area of the foil. It has been known to etch capacitor foil thereby producing a rough surface with increased area. Etching has been accomplished chemically by immersing foil in an acid or other corrosive liquid. However, acid etching is slow and it etches the foil irregularly, particularly the high purity foil that must be used for capacitors. Chemical etching is characterized by attack at spaced active sites which results in a relatively few pits which are large and so deep that they frequently perforate the foil.

Electrolytic etching has also been employed. In electrolytic etching the aluminum foil is connected as the anode in a cell in which a corrosive electrolyte such as sodium chloride, is maintained and etching is effected while a current passes through the anode and the electrolyte. Electrolytic etching accomplishes the etching process much more quickly and it characteristically produces more even etching than chemical etching, but still at spaced active sites.

In order to provide more sites for etching, it has been known deliberately to introduce impurities into aluminum that will be used for aluminum capacitor foil. Impurities introduced for improving etching are usually alkali or alkaline earth metals, and the prior art mentions specifically sodium, potassium, magnesium-zinc combinations, gallium and others. Many of these produce improved capacitor foils over pure aluminum with regard to etching, although frequently the impurities result in increased leakage current in capacitors made from etched and anodized foil.

The effectiveness of an etching process is often evaluated by the appearance of the foil. A shiny foil, that is one having few pits, is considered etched inadequately, a foil with a matte appearance is considered adequately etched while foils with dark matte appearances are considered excellently etched.

It has now been found that the criterion of shininess or a matte finish on aluminum foil is not adequate in evaluating the properties or characteristics of an aluminum foil for use in a capacitor. Many etched foils with excellent dark matte finishes, when formed into capacitors, do not have good capacitance. In exploring this criterion further, it has now been discovered that the uniformity of etching is not the primary criterion, but rather the type of etching that is effected. In examining the cross section of etched foil rather than its surface, it has been found that two types of etching may occur. One type of etching is the normal etching which is characterized by the existence of numerous well distributed shallow pits which create a rough surface on the foil. The other type of etching is called tunnel etching and it is characterized by the creation of relatively small-diameter, long, deep tunnels. It has been found that significant improvement in capacitor foils is obtained by tunnel etching and that ordinary etching, even if it creates extremely well distributed pits and a dark matte finish does not produce excellent capacitor foil.

The process of this invention provides for tunnel etching aluminum foil to produce a foil having low leakage current in the anodized condition, but with a large number of uniformly distributed tunnels penetrating the surface and a concomitantly greatly improved capacitance.

The invention includes preparing aluminum of at least 99.99% purity which contains at most 0.001% sodium and introducing into this aluminum from about 0.02% to about 0.1% magnesium. The aluminum thus prepared is cast into an ingot and rolled into a foil suitable for use in a capacitor. The foil is then electrically connected into a circuit as the anode, immersed in a suitable electrolyte and electrolytically etched by the conventional process for a time sufficient to provide it with a uniform matte finish. It has been found that the presence of from 0.02% to 0.1% magnesium in a substantially sodium-free foil will promote tunnel etching without appreciably reducing the electrical conductivity of the foil. Moreover, the etched and anodized foil will have low leakage current in an operating capacitor. It has also been found that even small quantities of sodium interfere with the good electrolytic etching and, therefore, sodium in any substantial quantity must be avoided as a constituent of the aluminum.

In another embodiment, it has been found that an even further improved capacitor foil may be produced if the ingot from which the foil is prepared is heated to a temperature of at least 950° F. and held at that temperature for at least two hours prior to being rolled into a foil. This thermal preheat treatment preconditions the aluminum so that more numerous and more uniformly distributed tunnels will be formed in the foil when it is electrolytically etched, thereby even further improving it for use in capacitors.

Following are several examples which are presented to illustrate the process of this invention and to compare it to prior processes. In all examples, an aluminum of a 99.99% purity was employed and the aluminum was pretreated so that it was free of sodium except in those cases where sodium is indicated as an ingredient. The total impurity level in all cases was less than 0.01% and the impurities that were measurable were silicon, iron, copper and titanium. The foils in all cases were fabricated as follows.

The 99.99% pure aluminum was melted and the desired quantity, if any, of additional elements was added to the melt. After thorough mixing, ingots were cast of the molten aluminum and each ingot, after it was cast, was split in half so that one half could be subjected to "high temperature preheat" and the other half could be subjected to "low temperature preheat" in order that comparative tests of thermal treatments could be performed. The high temperature preheat of the examples consisted of heating the half ingots to 1100° F. at a rate of 100° F. per hour and holding the ingots at that temperature for 24 hours. The low temperature preheat consisted of heating the other half of each ingot at a rate of 100° F. per hour to a temperature of 800° F. and holding it at that temperature for 6 hours. In both cases, the ingots were cooled quickly in forced air.

All ingots were then scalped to provide a smooth surface, reheated to 800° F. and rolled to a thickness of 0.125 inch. After this hot rolling, the ingots were rolled to final foil thickness by the following program:

Cooled to room temperature and rolled to 0.05 inch;
Anneal in nitrogen atmosphere at 750° F. for 6 hours;
Cool in nitrogen atmosphere to 200° F.;
Cold roll to 0.006 inch;
Anneal in nitrogen atmosphere at 900° F. for 6 hours;
Cool in nitrogen to 200° F.; and
Cool in air to room temperature.

The resultant foils were cleaned and then etched in an electrolyte consisting of 8% sodium chloride solution in deionized water. The electrolyte was maintained at 194° F. and etching was effected at a current density of 0.8 ampere per square foot of foil area. The etching process was conducted for 10 minutes. Following etching, the foil was cut into specimens 1 13/16" x 2 3/4" and mounted as the anodes in 12% boric acid solution. In the boric acid solution, an anodic oxide coating was placed on the specimens by anodizing at a current of 0.75 ampere and holding that current constant while the voltage built up to 500 volts, after which a constant voltage of 500 volts was held until the current declined to 0.02 ampere. During the anodizing, the electrolyte temperature was maintained between 200 and 212° F. Following the anodizing process, the specimens were rinsed and their capacitance was measured by immersing them in an aqueous solution containing 5% boric acid and 0.08% sodium tetraborate maintained between 85° F. and 95° F. The capacitance was measured at 450 volts.

Table I below sets forth the results observed in a series of examples.

TABLE I

| Example | Added element (wt. percent) | Pre-heat | Etchability Appearance | Etchability Tunnelling | Capacitance (microfarads) |
|---|---|---|---|---|---|
| 1 | None | Low | Matte | Moderate | 3.8 |
| 2 | do | High | do | do | 6.9 |
| 3 | 0.0022 Na | Low | Shiny | Partial | 4.85 |
| 4 | 0.0021 Na | High | do | do | 4.08 |
| 5 | 0.02 Ga | Low | Dark matte | None | 2.13 |
| 6 | 0.02 Ga | High | do | do | 2.75 |
| 7 | 0.02 Mg | Low | Matte | Moderate | 6.25 |
| 8 | 0.02 Mg | High | do | Extensive | 8.15 |
| 9 | 0.02 Mg | do | do | do | 8.20 |

From Table I, it can be seen that electrolytic etching of capacitor foil containing a small amount of magnesium greatly improved the capacitance of the foil per unit area over pure foils etched by the same process. Examples 3 and 4 also indicate the adverse effect of sodium on the capacitance of a foil, even in extremely small concentrations. Examples 5 and 6 illustrate that the appearance of an etched foil is a false criterion for judging its suitability for use in capacitors. In Examples 5 and 6, gallium was added to the aluminum, which is known to produce an etched foil with an excellent dark matte appearance, and yet the foil produced from the gallium-containing alloy made poor capacitors because there was an absence of tunnel etching.

Examples 7, 8 and 9 illustrate that the inclusion of a small amount of magnesium significantly improves the etchability of a foil for use in capacitors. The examples also show that the high temperature pretreatment improves the etchability of the capacitor foil in all cases where a significant capacitance is obtained.

The presence of magnesium in quantities substantially greater than 0.1% by weight interferes with the electrical conductivity of the foil and reduces its effectiveness for use in capacitors.

What is claimed is:

1. The process for producing aluminum capacitor foil which comprises heating an alloy consisting essentially of by weight from 0.02% to about 0.1% magnesium, less than 0.002% sodium and the balance aluminum to a temperature of at least about 950° F. and maintaining at that temperature for a period of at least about 2 hours prior to forming said alloy into foil, forming said alloy into a foil suitable for use in capacitors, electrolytically etching said foil and subsequent to said etching anodically oxidizing said foil.

2. The capacitor foil formed by the process according to claim 1.

References Cited

UNITED STATES PATENTS

| 1,750,700 | 3/1930 | Berthleny | 75—138X |
| 2,199,445 | 5/1940 | Ruben | 175—315 |
| 2,383,026 | 8/1945 | Toleik | 75—138X |
| 2,886,432 | 5/1959 | Schmitt et al. | 75—138 |
| 3,078,191 | 2/1963 | Maeda | 148—11.5 |
| 3,258,318 | 6/1966 | Gruhl | 29—183 |
| 3,266,945 | 8/1966 | Helling et al. | 148—11.5 |
| 3,351,442 | 11/1967 | Hooper | 29—183.5 |
| 2,826,518 | 3/1958 | Anderson | 148—32 |
| 3,475,289 | 10/1969 | Hunter | 204—33 |

FOREIGN PATENTS 22,126   1963   Japan.

JOHN H. MACK, Primary Examiner

R. J. FAY, Assistant Examiner

U.S. Cl. X.R.

117—200; 156—22; 204—58, 141